US009258255B2

(12) United States Patent
Banerjee et al.

(10) Patent No.: US 9,258,255 B2
(45) Date of Patent: Feb. 9, 2016

(54) HIERARCHICAL PROGRAMMING OF DUAL-STACK SWITCHES IN A NETWORK ENVIRONMENT

(71) Applicant: CISCO TECHNOLOGY, INC., San Jose, CA (US)

(72) Inventors: Ayan Banerjee, Fremont, CA (US); Ramesh V. N. Ponnapalli, Sunnyvale, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 86 days.

(21) Appl. No.: 14/276,628

(22) Filed: May 13, 2014

(65) Prior Publication Data
US 2015/0295862 A1 Oct. 15, 2015

Related U.S. Application Data

(60) Provisional application No. 61/978,219, filed on Apr. 11, 2014.

(51) Int. Cl.
*H04L 12/931* (2013.01)
*H04L 29/12* (2006.01)

(52) U.S. Cl.
CPC ............ *H04L 49/602* (2013.01); *H04L 61/251* (2013.01); *H04L 61/2542* (2013.01); *H04L 61/6022* (2013.01); *H04L 61/6059* (2013.01); *H04L 61/6086* (2013.01)

(58) Field of Classification Search
None
See application file for complete search history.

(56) References Cited

U.S. PATENT DOCUMENTS

| 6,061,345 | A | 5/2000 | Hahn et al. |
|---|---|---|---|
| 6,708,219 | B1 | 3/2004 | Borella et al. |
| 7,035,261 | B2 | 4/2006 | Ogawa et al. |
| 8,335,884 | B2 | 12/2012 | Hamadani et al. |
| 8,423,669 | B2 * | 4/2013 | Matsuhira ........... H04L 12/4604 709/227 |
| 8,654,680 | B2 | 2/2014 | Subramanian et al. |

(Continued)

OTHER PUBLICATIONS

Nadas, S., "Virtual Router Redundancy Protocol (VRRP) Version 3 for IPv4 and IPv6," Internet Engineering Task Force (IETF), Request for Comments 5798, Mar. 2010, 40 page; https://tools.ietf.org/html/rfc5798.

(Continued)

*Primary Examiner* — Yemane Mesfin
*Assistant Examiner* — Peter Chen
(74) *Attorney, Agent, or Firm* — Patent Capital Group

(57) ABSTRACT

An example method for hierarchical programming of dual-stack switches in a network environment is provided and includes receiving packets from the network at a line card in the modular switch, a first portion of the packets being destined to Internet Protocol version 6 (IPv6) destination IP (DIP) addresses and a second portion of the packets being destined to IPv4 DIP addresses, and performing hierarchical lookups of the IPv6 DIP addresses and the IPv4 DIP addresses. Layer 3 (L3) lookups for the IPv6 DIP addresses are performed at the line card, and L3 lookups for IPv4 DIP addresses are performed at a fabric module in the modular switch. The line card and the fabric module are interconnected inside a chassis of the modular switch. In specific embodiments, the method further comprises inspecting the packets' destination Media Access Control (DMAC) addresses comprising router MAC addresses indicative of IPv6 or IPv4 address families.

20 Claims, 7 Drawing Sheets

(56) References Cited

U.S. PATENT DOCUMENTS

| | | | |
|---|---|---|---|
| 2003/0202510 A1 | 10/2003 | Witkowski et al. | |
| 2005/0068948 A1* | 3/2005 | Bhardwaj | H04L 12/4633 370/389 |
| 2007/0195778 A1* | 8/2007 | Tatar | H04L 49/1546 370/392 |
| 2011/0225207 A1* | 9/2011 | Subramanian | H04L 45/586 707/803 |
| 2012/0008633 A1* | 1/2012 | Kuramoto | H04L 12/4625 370/401 |
| 2012/0127854 A1* | 5/2012 | Khetan | H04L 12/4641 370/218 |

OTHER PUBLICATIONS

Broadcom Data Sheet, "BCM56850 StrataXGS® Trident II Switching Technology," Broadcom Corporation, Jul. 3, 2013, 2 pages; https://www.broadcom.com/collateral/pb/56850-PB03-R.pdf.

\* cited by examiner

US 9,258,255 B2

HIERARCHICAL PROGRAMMING OF DUAL-STACK SWITCHES IN A NETWORK ENVIRONMENT

CROSS-REFERENCE TO RELATED APPLICATION

This application claims the benefit of priority under 35 U.S.C. §119(e) to U.S. Provisional Application Ser. No. 61/978,219, entitled "MAXIMIZE DUAL-STACK FIRST HOP ROUTER MEDIA ACCESS CONTROL ENTRIES BY HIERARCHICAL PROGRAMMING" filed Apr. 11, 2014, which is hereby incorporated by reference in its entirety.

TECHNICAL FIELD

This disclosure relates in general to the field of communications and, more particularly, to hierarchical programming of dual-stack switches in a network environment.

BACKGROUND

Data centers are increasingly used by enterprises for effective collaboration and interaction and to store data and resources. A typical data center network contains myriad network elements, including hosts, load balancers, routers, switches, etc. The network connecting the network elements provides secure user access to data center services and an infrastructure for deployment, interconnection, and aggregation of shared resource as required, including applications, hosts, appliances, and storage. Improving operational efficiency and optimizing utilization of resources in data centers are some of the challenges facing data center managers. Data center managers want a resilient infrastructure that consistently supports diverse applications and services and protects the applications and services against disruptions. A properly planned and operating data center network provides application and data integrity and optimizes application availability and performance.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

An example method for hierarchical programming of dual-stack switches in a network environment is provided and includes receiving packets from the network at a line card in a modular (e.g., comprised of different pluggable modules) switch, a first portion of the packets being destined to Internet Protocol version 6 (IPv6) destination IP (DIP) addresses and a second portion of the packets being destined to IPv4 DIP addresses, and performing hierarchical lookups of the IPv6 DIP addresses and the IPv4 DIP addresses. Layer 3 (L3) lookups for the IPv6 DIP addresses are performed at the line card, and L3 lookups for IPv4 DIP addresses are performed at a fabric module in the modular switch. The line card and the fabric module are interconnected inside a chassis of the modular switch.

As used herein, a "line card" comprises a modular electronic circuit on a printed circuit board that provides a transmitting or receiving port for interfacing with a network. The term "fabric module" refers to a modular electronic circuit on a printed circuit board that interconnects at least two line cards inside the modular switch. The fabric module is a part of a switching fabric inside the modular switch, enabling packet forwarding from one line card to another within the modular switch. The "modular switch" comprises a network element built up from multiple pluggable modules that are connected and combined to enable various switching and routing functionalities. The modular switch differs from a fixed configuration switch in its configurability, scalability and customizability. For example, modular switches are generally high capability switches that can be customized as per network requirements, for example, by adding or removing different line cards with various numbers of ports according to network load and other specifications.

EXAMPLE EMBODIMENTS

Figure 1:
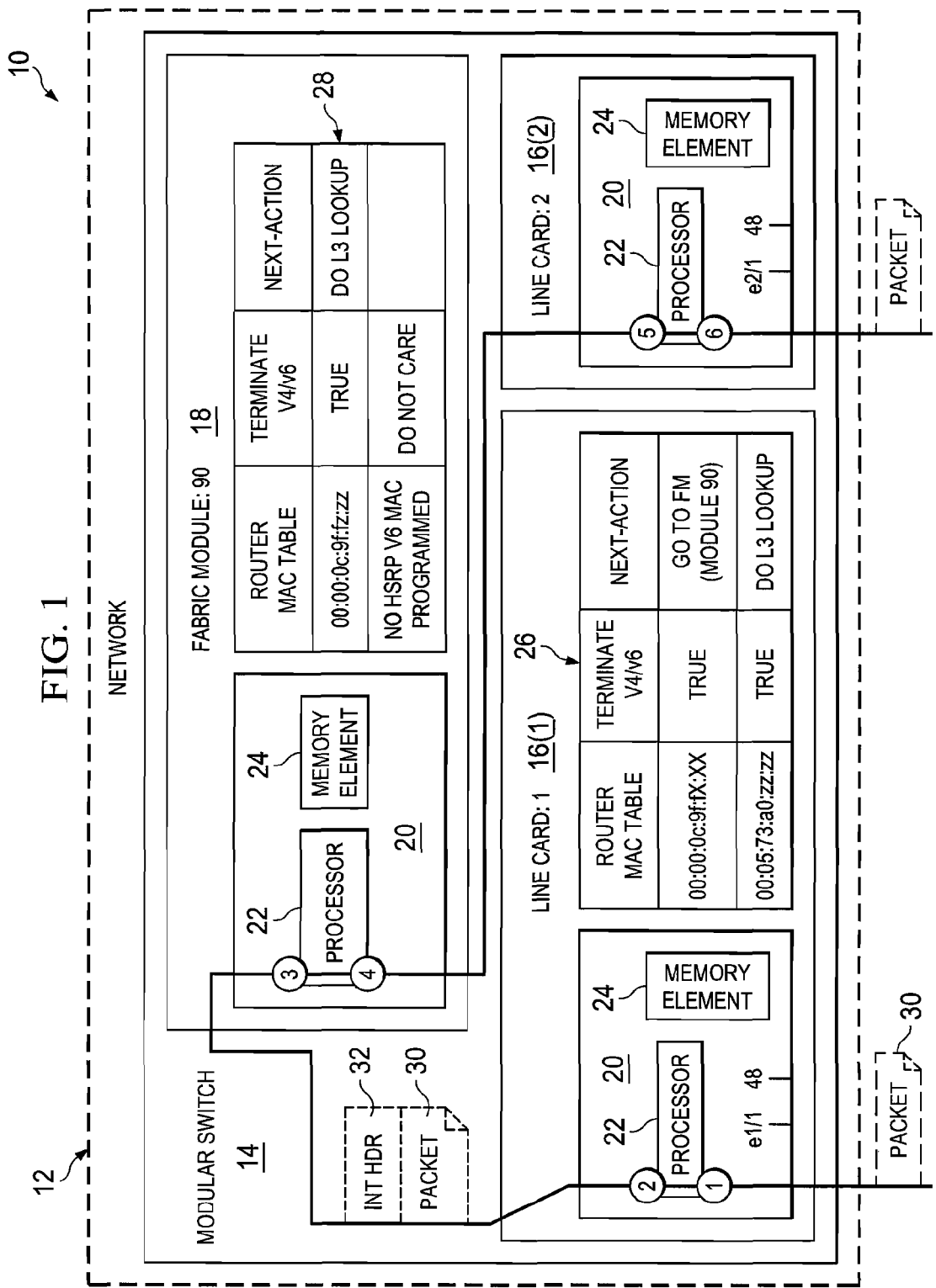
FIG. 1 is a simplified block diagram illustrating a communication system for hierarchical programming of dual-stack switches in a network environment.

Turning to FIG. 1, FIG. 1 is a simplified block diagram illustrating a communication system 10 for hierarchical programming of dual-stack switches in a network environment in accordance with one example embodiment. FIG. 1 illustrates a communication system 10 comprising a network 12. A modular switch 14 in network 12 includes a plurality of line cards 16(1)-16(2) and a fabric module 18. Note that only two line cards and one fabric module are shown for ease of illustration; any suitable number of line cards and fabric modules may be included within modular switch 14 within the broad scope of the embodiments of communication system 10. Line cards 16(1)-16(2) connect modular switch 14 to network 12; line cards 16(1)-16(2) are connected to fabric module 18 within a chassis (e.g., covering, housing, etc.) of modular switch 14.

Each line card 16(1)-16(2) and fabric module 18 may include suitable chip sets 20, comprising, for example, a Broadcom® T2 chipset or equivalent, with application specific integrated circuits (ASICs), suitable processors (e.g., processor 22) and memory elements (e.g., memory element 24). Note that each chip set 20 in line cards 16(1)-16(2) and fabric module 18 may be configured differently, or similarly, and may comprise different or similar individual hardware components based on appropriate functional specifications.

Each line card 16(1)-16(2) may include a V6 router media access control (MAC) table 26, comprising various flow forwarding instructions for performing switching and/or routing of packets incoming from network 12. Each fabric module 18 may include a V4 router MAC table 28 comprising various flow forwarding instructions for performing switching and/or routing of packets incoming from an ingress line card (e.g., 16(1)). As used herein, the term "L2 lookup" or "switching" refers to Layer 2 (L2) packet forwarding (e.g., forwarding packets based on L2 header information (e.g., MAC address)) and the term "L3 lookup" or "routing" refers to Layer 3 (L3) packet forwarding (e.g., forwarding packets based on L3 header information (e.g., IP address)). Note that L2 and L3 refer to Layer 2 and Layer 3 of the Open Systems Interconnection (OSI) network model.

Embodiments of communication system 10 may use hierarchical routing and programming of address family (e.g., IPv6; IPv4)-scoped entries in line cards 16(1)-16(2) and fabric module 18 to scale a number of first-hop-router groups that can be programmed to double the number of entries that could otherwise have been programmed. Packets 30 traversing modular switch 14 from and to line cards 16(1)-16(2) may include an internal header 32 that indicates, for example, a suitable forwarding action at fabric module 18 or an egress line card.

For purposes of illustrating the techniques of communication system 10, it is important to understand the communications that may be traversing the system shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

In traditional modular switches, line cards and fabric modules are equipped with multiple network forwarding engines (NFEs), which are software applications that perform packet lookup, processing and forwarding functions. The NFEs use a combination of dedicated ternary content addressable memory (TCAM) table space and shared hash table memory known as Unified Forwarding Table (UFT) to store Layer-2 and Layer-3 forwarding information. The UFT can be flexibly partitioned into a MAC Address Table (also called L2 MAC table), an IP Host Table (also called L3 Host Table) and a longest prefix matching (LPM) Table.

The UFT tables on line cards and fabric modules are configured for different forwarding lookup functions. The UFT on line cards stores the L2 MAC table and the L3 Host table; thus, line cards are responsible for L2 switching lookup and L3 host routing lookup. The UFT on fabric modules hosts the L3 LPM table, and perform L3 LPM routing lookup. NFEs on the line cards perform L2 switching lookups and L3 host routing lookups. The fabric module provides non-blocking data forwarding connectivity for line cards and performs distributed LPM routing lookup for IPv4 and IPv6 traffic.

When a packet ingresses the modular switch through a front panel port of one of the line cards, it goes through the ingress pipeline on the NFE of the line card. The packet is parsed to extract and save information such as L2 header, EtherType, L3 header, TCP IP protocols, etcetera, which can be used for subsequent packet lookup and processing logic. As the packet goes through the ingress pipeline, it is subjected to L2 switching and L3 routing lookups. The NFE examines the destination MAC address (DMAC) of the packet to determine if the packet is to be L2 switched or L3 routed. If the DMAC matches the switch's own router MAC address, the packet is passed to the L3 routing lookup logic. If the DMAC does not belong to the switch, an L2 switching lookup based on the DMAC and VLAN ID is performed. If a match is found in the MAC address table, the packet is sent towards the egress port. If there is no match for DMAC and VLAN combination, the packet is forwarded to all ports in the same VLAN.

As part of the L2 switching logic, the NFE also performs source MAC (SMAC) address lookup for hardware-based learning. The SMAC along with the VLAN ID is used to search the MAC address table. If there is no match, the new address is learned and associated with the ingress port of the packet. If a match is found, no learning action is performed. Entries that are not used for an extended period of time (e.g., a configurable aging time) are automatically deleted.

Inside the L3 lookup logic on the line card NFE, the DIP is used for searching in the L3 host table. The L3 host table stores forwarding entries for directly attached hosts or learned host routes for both IPv6 and IPv4 addresses. If the DIP matches an entry in the host table, the entry indicates the destination port, next-hop MAC address and egress VLAN. If there is no match to the DIP in the host table, the packet is forwarded to the fabric module where the longest prefix match (LPM) lookup is performed in the LPM routing table. When performing L2 switching and L3 host routing, if the egress port is local to the NFE, packets are forwarded locally by the NFE without going to the fabric modules.

When the packet is forwarded to the fabric module, the fabric module can take different actions based on the lookup results on the ingress line card. In cases where the packet is an L2 switched or L3 host routed packet, the ingress line card has resolved the egress port, the next-hop MAC address and the egress VLAN information. The fabric module will simply forward the packet to the egress line card. If the packet needs a LPM lookup, the fabric module searches the LPM table and uses the best match for the destination IP address (DIP) to forward the packet. If there is no match for the DIP, the packet is dropped.

In traditional forwarding, a number of router MAC entries dictates a scale for configuring Hot Standby Router Protocol (HSRP), Virtual Router Redundancy Protocol (VRRP) and their IPv6 counterpart on switches and routers in a network. HSRP is used within a group of routers to select an active router and a standby router. In a group of router interfaces, the active router is the router of choice for routing packets; the standby router is the router that takes over when the active router fails or when preconfigured conditions are met. HSRP is designed to provide only a virtual first hop for IPv6 or IPv4 hosts. Most IP hosts have an IP address of a single router configured as the default gateway. When HSRP is used, the HSRP virtual IP address is configured as the host's default gateway instead of the actual IP address of the router. When HSRP is configured on a network segment, it provides a virtual MAC address and an IP address that is shared among a group of routers running HSRP. The address of the HSRP group is referred to as the virtual IP address. One of these devices is selected by the protocol to be the active router. The active router receives and routes packets destined for the MAC address of the group. For n routers running HSRP, n+1 IP and MAC addresses are assigned.

In the HSRP IPv4 scenario, the virtual IP address is an IPv4 address that is shared among a group of routers that run HSRP. The HSRP IPv6 group has a virtual MAC address that is derived from the HSRP group number and a virtual IPv6 link-local address that is, by default, derived from the HSRP virtual MAC address. HSRP IPv6 uses a different virtual MAC address block than does HSRP for IPv4: 0005.73A0.0000 through 0005.73A0.0FFF. The HSRP global IPv6 address is used to configure multiple non-link local addresses as virtual addresses for storage and management of multiple global IPv6 virtual addresses in addition to the existing primary link-local address. Thus, the router MAC address according to HSRP can indicate whether the DIP belongs to the IPv4 address family or the IPv6 address family.

VRRP specifies an election protocol that dynamically assigns responsibility for a virtual router to one of the VRRP routers on a LAN. The virtual router is defined by its virtual router identifier (VRID) and a set of either IPv4 or IPv6 address(es). The VRRP router may associate the virtual router with its real address on an interface. The scope of each virtual router is restricted to a single LAN. In the IPv4 case, each router is permanently assigned an IPv4 address on the LAN interface and each host installs a static default route through one of the routers. In the IPv6 case, each router has a link-local IPv6 address on the LAN interface and each host learns a default route from Router Advertisements through one of the routers. Thus, the router MAC address according to VRRP can indicate whether the DIP belongs to the IPv4 address family or the IPv6 address family.

In a general sense, all incoming packets into the modular switch have an Ethernet Header comprising the DMAC address, followed by an IP header comprising the DIP, and payload comprising data. Most L3 protocols use a system-wide router MAC address (e.g., MAC address of a single default gateway) and do not have per-VLAN/group-router-MAC like HSRP/VRRP (e.g., MAC address shared between several routers). In the HSRP or VRRP case, MAC tables in the line cards are populated with the appropriate router-MAC addresses (which may be shared by different routers). Typically, the first forwarding lookup at the router is a L2 lookup using the MAC address, and if the MAC address is a router-MAC, more expensive and/or extensive additional L3 lookup is performed on the packet. L2 switching is cheaper and faster than the subsequent L3 lookup.

At 128 bits, the address space of IPv6 is much higher than that of IPv4 at 32 bits; however, each IPv6 address takes up four time the storage space (e.g., including number of entries that can be programmed). Thus, in a commercial off-the-shelf hardware switch, the number of programmable entries are restricted to 512 for IPv6. This can impact the scale in a typical datacenter, service-provider network, or enterprise network that includes virtual local area networks (VLANs); a number of VLANs that can be deployed in such dual stack environment (e.g., where the switch has access to both IPv4 and IPv6 technology) is less than 256.

In a general sense, VLANs, which are switched networks, are associated with individual networks or sub-networks. Thus, each VLAN requires a separate entry in the L3 forwarding table. Because of the restriction on the number of IPv6 entries that can be programmed in any given hardware (e.g., line card), the number of VLANs that can be configured in the network can be limited, potentially severely constraining switch deployment in a layer 2/layer 3 (L2/L3) boundary where a first-hop router is encountered.

Moreover, in the traditional implementation where virtual MAC addresses are programmed (e.g., according to HSRP and VRRP) for the first-hop router in the network, the limit on the number of virtual entries that can be programmed is typically the number of entries that can be programmed in a single hardware unit (e.g., hardware switch). This data is replicated across all hardware units in the network. Given that most network customers have 300-400 VLANs in a dual-stack environment, a 512 entry limit is clearly not enough for the first-hop router to accommodate the VLANs and the virtual MAC addresses. The requirement is to have at least 800 entries.

Communication system 10 is configured to address these issues (among others) to offer a system and method for hierarchical programming of dual-stack switches in a network environment. According to various embodiments, IPv6 routes (e.g., routes are network paths selected according to routing protocols using the IP address; IPv6 routing and IPv4 routing uses protocols applicable to IPv6 addresses and IPv4 addresses, respectively) are programmed on line cards 16(1)-16(2) and IPv4 routes are programmed on fabric module 18. Line cards 16(1)-16(2) may be programmed to direct substantially all IPv4 routes to fabric module 18 without any L3 lookup at the line card. Hierarchical lookups of destination IP addresses (DIPs) of packets (e.g., packet 30) may be performed, with lookups for IPv6 DIPs performed at line cards 16(1)-16(2) and lookups for IPv4 DIPs performed at fabric module 18. In addition, the DMAC addresses in headers of incoming packets are inspected (e.g., parsed, examined, etc.) at line cards 16(1)-16(2). The DMAC addresses may comprise router MAC addresses, indicative of the IPv6 or IPv4 address families.

Embodiments of communication system 10 can support a variant of disjoint programming of the routes to increase scale. When the address-family (e.g., IPv6, IPv4) scoped routes are programmed in different modules (e.g., line cards 16(1)-16(2) and fabric module 18) of modular switch 14, hierarchical look-ups may be performed for the router-MAC addresses in the appropriate modules. In an example embodiment, substantially all IPv6 router-MACs are programmed on line cards 16(1)-16(2), along with a single entry to direct substantially all IPv4 router MACs to be sent onwards to fabric module 18. On fabric module 18, the actual lookup is performed for the IPv4-router-MAC entries. Thus by utilizing the hardware resources of the line cards and fabric modules separately, and distributing the lookup, the number of entries that can be programmed can be scaled appropriately. Thus an increased scale than what can be achieved using traditional programming flows may be possible.

In many embodiments, V6 router MAC table 26 and V4 router MAC table 28 may associate DMAC addresses of the packets with a next action to be performed. V6 router MAC table 26 may indicate a next action comprising: for DMAC addresses comprising router MAC addresses indicative of IPv6 address family, L3 lookups of the IPv6 DIPs at the ingress line card, and for DMAC addresses comprising router MAC addresses indicative of IPv4 address family, a single entry specifying forwarding to fabric module 18, with a last 12 bits of the router MAC addresses being wild-carded (e.g., to support the single entry for substantially all IPv4 address families). V4 router MAC table 28 may indicate a next action comprising: for DMAC addresses comprising router MAC addresses indicative of IPv6 address family, switching to an egress line card at the fabric module, and for DMAC addresses comprising router MAC addresses indicative of IPv4 address family, L3 lookup of the IPv4 DIPs at the fabric module.

During operation, assume, merely for example purposes, and not as a limitation, that packet 30 is received at a port e1/1 in line card 16(1) (operation 1). Assume, merely for example purposes, and not as a limitation, that DMAC in packet 30 indicates an HSRPv6 router MAC address (e.g., 00:05:73:a0: zz:zz). In a general sense, the router MAC address may indicate the address family—whether IPv4 or IPv6—of the DIP of the packet. An L2 lookup in V6 router MAC table 26 indicates that the next action to be performed for the HSRPv6 router MAC address is a L3 lookup at line card 16(1) (operation 2). The L3 lookup may be performed, and internal header 32 may be generated with a flag to indicate that switching should be performed at fabric module 18 (e.g., because the L3 lookup has resolved the egress port, the next-hop MAC address and the egress VLAN information).

Packet 30, including internal header 32, may be forwarded to fabric module 18. Fabric module 18 may inspect the flag (operation 3), perform a switching operation (operation 4) to identify the egress line card (e.g., 16(2)) and port (e.g., e2/1), and forward packet 30 with a modified internal header 32 to egress line card 16(2). At egress line card 16(2), internal header 32 may be decapsulated (operation 5), and packet 30 may be sent out (operation 6) through the appropriate egress port (e.g., e2/1).

On the other hand, assume, merely for example purposes, and not as a limitation, that DMAC in packet 30 indicates an HSRP (e.g., based on IPv4) address (e.g., 00:00:0c:9f:fz:zz). In many embodiments, IPv4 router MAC addresses may be wild-carded (e.g., use of a wild card as a multiple character replacement in classification rules; the wildcard may be substituted for any of a defined subset of all possible characters) in the last 12 bits with next action to forward to fabric module 18. The L2 lookup in V6 router MAC table 26 indicates that the next action to be performed is to forward packet 30 to fabric module 18 (e.g., module 90) (operation 2). Internal header 32 may be generated with a flag to indicate that routing should be performed at fabric module 18 (e.g., because the L3 lookup is yet to be performed).

Packet 30, including internal header 32, may be forwarded to fabric module 18. Fabric module 18 may inspect the flag (operation 3), and lookup V4 router MAC table 28 (operation 4) to determine the next action. The next action may indicate an L3 lookup to identify the egress line card (e.g., 16(2)) and port (e.g., e2/1). Fabric module 18 may modify internal header 32 appropriately and forward packet 30 to egress line card 16(2). At egress line card 16(2), internal header 32 may be decapsulated (operation 5), and packet 30 may be sent out (operation 6) through the appropriate egress port (e.g., e2/1).

According to various embodiments, IPv4 lookups may be offloaded to fabric module 18, where the NFE at the fabric module performs L3 lookup of the IPv4 DIP and resolves egress port and next hop information. Note that in some embodiments, the fabric modules may be configured with IPv6 routes and the line cards may be configured with IPv4 routes, with corresponding lookup functions separated and distributed between the line cards and the fabric modules. Embodiments of the communication system allows for increasing the router-MAC-table size in the modular chassis and allows for use of the modular platform in a typical Layer-2/Layer-3 boundary nodal position even though each individual hardware processor (e.g., ASIC) has limited table capacity.

Turning to the infrastructure of communication system 10, the network topology can include any number of servers, hardware accelerators, virtual machines, switches (including distributed virtual switches), routers, and other nodes interconnected to form a large and complex network. A node may be any electronic device, client, server, peer, service, application, or other object capable of sending, receiving, or forwarding information over communications channels in a network. Elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs.

Communication system 10 may include a configuration capable of TCP/IP communications for the electronic transmission or reception of data packets in a network. Communication system 10 may also operate in conjunction with a User Datagram Protocol/Internet Protocol (UDP/IP) or any other suitable protocol, where appropriate and based on particular needs. In addition, gateways, routers, switches, and any other suitable nodes (physical or virtual) may be used to facilitate electronic communication between various nodes in the network.

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of communication system 10. It should be understood that communication system 10 shown in FIG. 1 is simplified for ease of illustration.

The example network environment may be configured over a physical infrastructure that may include one or more networks and, further, may be configured in any form including, but not limited to, local area networks (LANs), wireless local area networks (WLANs), VLANs, metropolitan area networks (MANs), VPNs, Intranet, Extranet, any other appropriate architecture or system, or any combination thereof that facilitates communications in a network. The example network environment of home network 17 may be configured over a physical infrastructure that may include WLANs (including Bluetooth), and wired LANs.

In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

In various embodiments, modular switch 14 may comprise a hardware unit (e.g., Cisco® N9500 switch) with line cards 16(1)-16(2) and fabric module 18 programmed suitably to perform the various operations described herein. Note that modular switch 14 may include various other modules, software and features that are not shown in the figure for ease of illustration. In some embodiments, modular switch 14 may comprise L2 and L3 non-blocking Ethernet switches with the hardware capability to support Fibre Channel over Ethernet (FCoE). With backplane bandwidth of more than 60 terabits per second (Tbps) in some embodiments, modular switch 14 can support 100 Gigabit Ethernet interfaces through a comprehensive selection of modular line cards. Modular switch 14 may be configurable with high capacity Ethernet ports, with sufficient capacity for both access- and aggregation-layer deployments.

Figure 2:
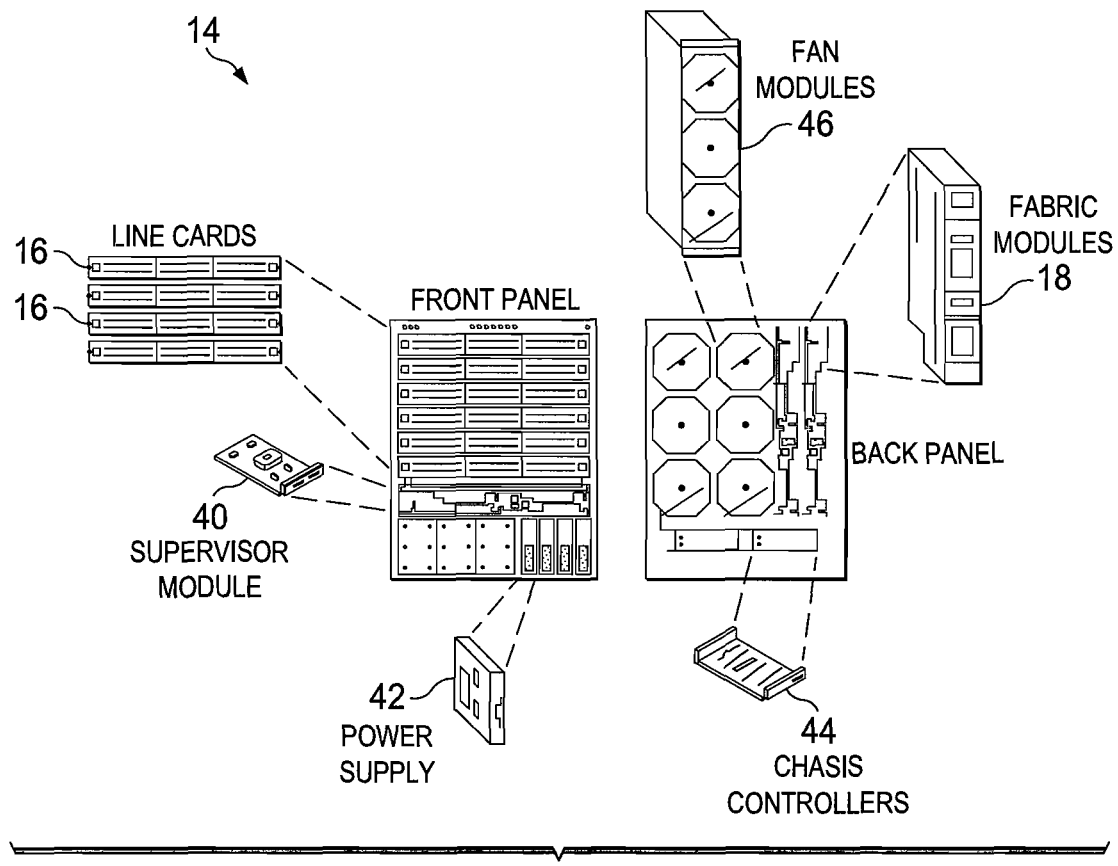
FIG. 2 is a simplified block diagram illustrating example details of embodiments of the communication system.

Turning to FIG. 2, FIG. 2 is a simplified block diagram illustrating example details of another embodiment of communication system 10. In a particular embodiment of a communication system 10 where routing is performed in a modular switching platform (e.g., Cisco® N9500), modular switch 14 can include multiple slots for attaching line cards 16. Modular switch 14 may include a supervisor module 40, a power supply 42, chassis controllers 44, and one or more fan modules 46.

In various embodiments, modular switch 14 can support a variety of line cards 16, all of which can be configured in any combination. In an example embodiment, modular switch 14 internally uses a Clos fabric design that interconnects front-mounted line cards 16 with rear-mounted fabric modules 18. Modular switch 14 can support multiple (e.g., six) fabric modules 18, each of which provides sufficient (e.g., 10.24-Tbps) line-rate packet forwarding capacity. Fabric modules 18 are directly connected to line cards 16 with connecting pins. In an example embodiment, line cards 16 and fabric modules 18 have orthogonal orientations in the chassis so that each fabric module 18 is connected to all line cards 16 and vice versa.

A pair of redundant supervisor modules 40 may manage switch operations using a state-synchronized active-standby model. Each supervisor module 40 may include a quad-core processor (CPU), 16 GB of random access memory (RAM), and a 64-GB solid-state drive (SSD) for boot-up and analytics information. Supervisor module 40 may accept an external clock and support management through various ports including universal serial bus (USB) ports, serial console, and appropriate network ports. Supervisor module 40 may be responsible for control-plane functions of modular switch 14. A pair of redundant chassis controllers 44 may offload chassis management functions (e.g., non-data path functions) from supervisor modules 40. Chassis controllers 44 may be responsible for managing power supply 42 and fan trays 46 and can be a central point between supervisor modules 40, fabric modules 18, and line cards 16.

Both line cards 16 and fabric modules 18 may be equipped with multiple NFEs (e.g., in a form of suitable software, executable, or other application) that perform packet lookup, processing and forwarding functions. In some embodiments, some of the ports (e.g., 12 40GE ports) on line cards 16, clocked appropriately (e.g., at 42GE) to accommodate extra bits in internal header 32, are used for internal connectivity towards fabric modules 18. The other ports on line cards 16 may be used as front panel interfaces to support user data ports.

Figure 3:
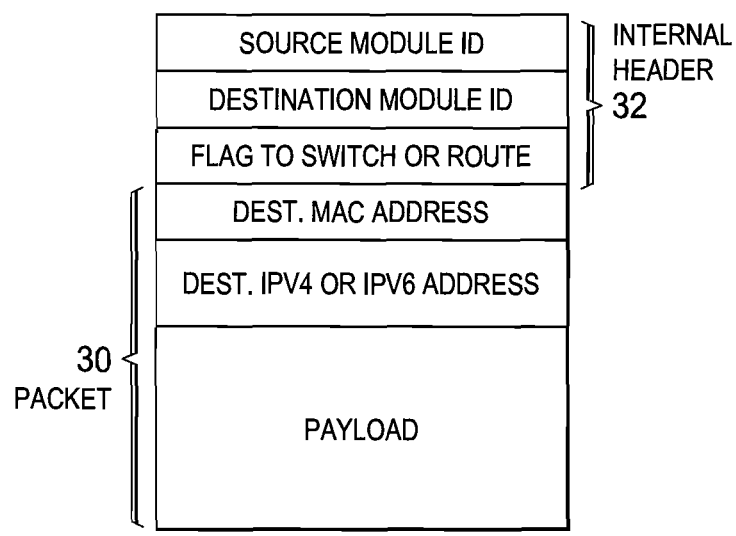
FIG. 3 is a simplified block diagram illustrating other example details of embodiments of the communication system.

Turning to FIG. 3, FIG. 3 is a simplified block diagram illustrating example details of an embodiment of communication system 10. Within modular switch 14, packet 30 may be forwarded between line cards 16 and fabric modules 18 according to information in internal header 32. Internal header 32 may include an identifier (ID) of a source module (e.g., ingress line card), a destination module ID (e.g., egress line card; fabric module; etc.) and a flag indicating whether to switch or route the packet. Packet 30 may include a payload (comprising communication data) and network headers including network information, such as DMAC address, and DIP (IPv4 or IPv6).

If the flag in internal header 32 is set to switch for packet 30 being forwarded from the ingress line card (e.g., 16(1)) to fabric module 18, an L2 lookup of the interface (e.g., connecting pin) to send out packet 30 to the egress line card (e.g., 16(2)) may be performed at fabric module 18. On the other hand, if the flag is set to route for packet 30 being forwarded from the ingress line card (e.g., 16(1)) to fabric module 18, an L3 lookup of the DIP may be performed at fabric module 18. The next hop information may be ascertained from the lookup and packet 30 forwarded appropriately to the egress line card (e.g., 16(2)).

Figure 4:
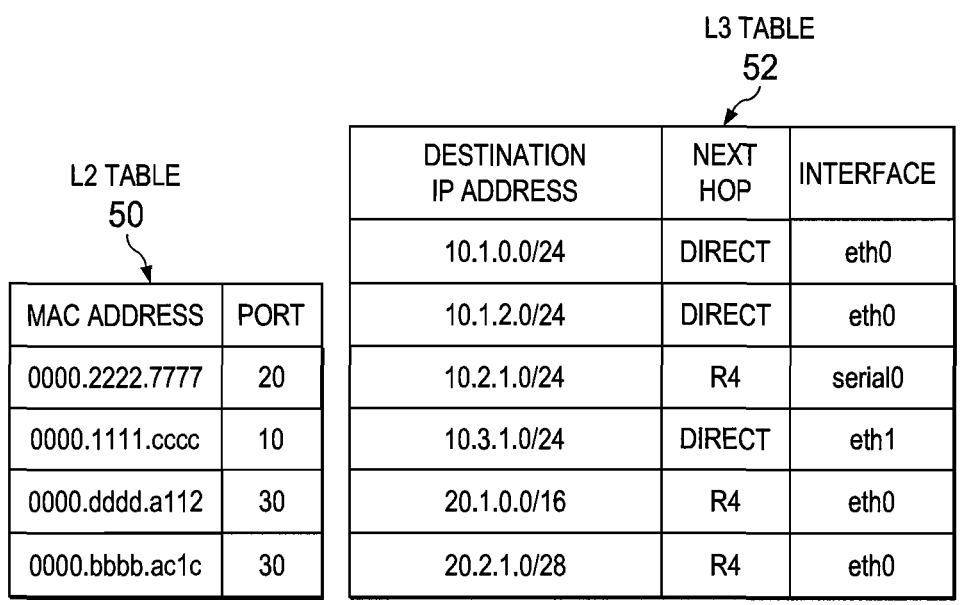
FIG. 4 is a simplified block diagram illustrating yet other example details of embodiments of the communication system.

Turning to FIG. 4, FIG. 4 is a simplified block diagram illustrating example details of an embodiment of communication system 10. Example L2 table 50 includes MAC addresses and corresponding ports. For example, to send packet 30 to destination MAC address 0000.2222.7777, port 20 may be used. Example L3 table 52 includes the DIP and associated next hop information. For example, to send packet 30 to DIP 10.1.0.0/24, the next hop is directly on the line card, at interface eth0; to send packet 30 to DIP 10.2.1.0/24, the next hop is router R4, at interface serial0; and so on. Both line cards 16 and fabric modules 18 may include L2 tables 50 and L3 tables 52 for performing L2 lookup and L3 lookup, respectively. In some embodiments, line cards 16 may be configured with L3 table 52 including IPv6 DIPs; fabric modules 18 may be configured with L3 table 52 including IPv4 DIPs; and vice versa.

Figure 5:
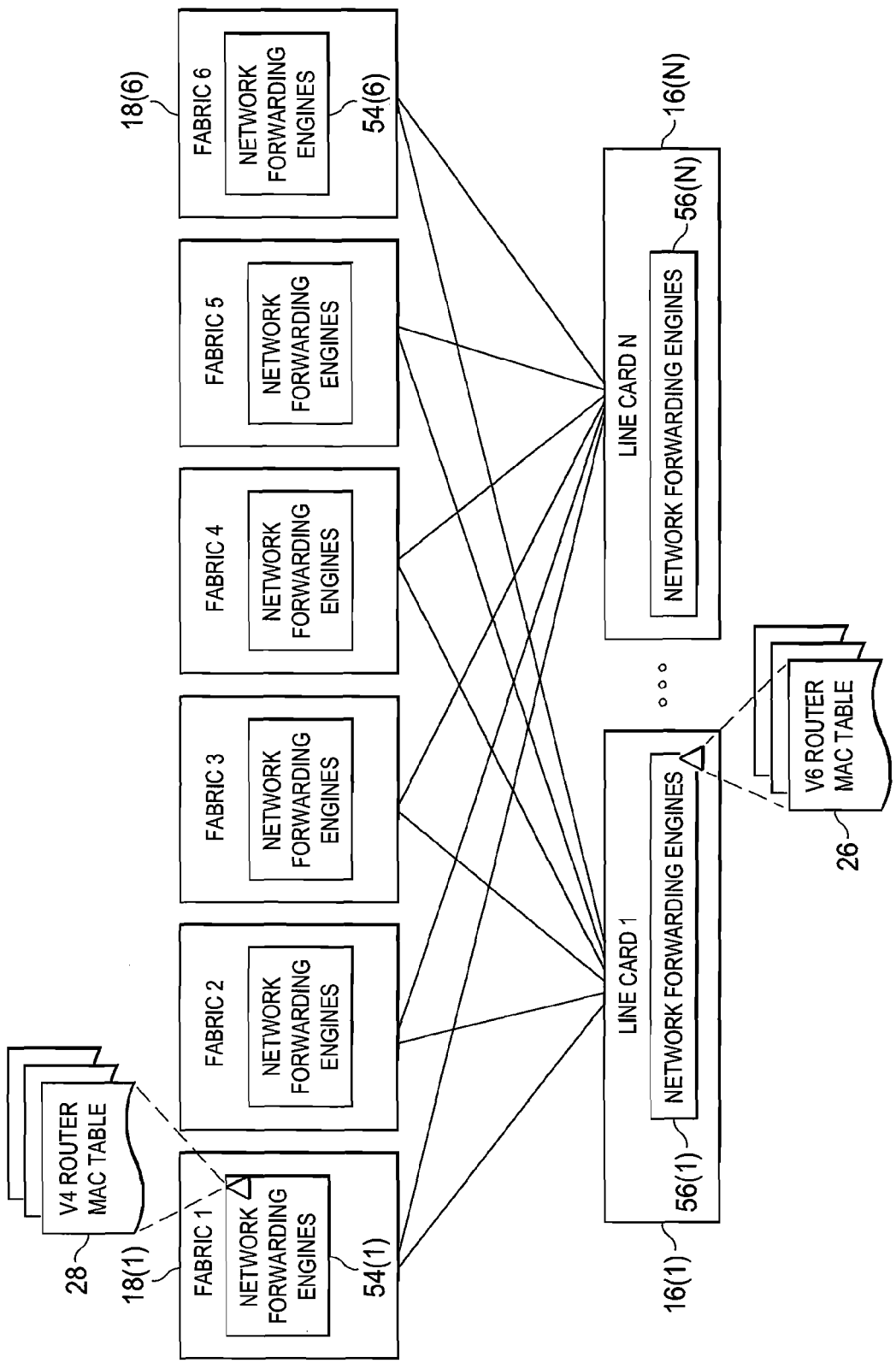
FIG. 5 is a simplified block diagram illustrating yet other example details of embodiments of the communication system.

Turning to FIG. 5, FIG. 5 is a simplified block diagram illustrating example details of an embodiment of communication system 10. Fabric modules 18(1)-18(6) include respective NFEs 54(1)-54(6). Each NFE 54(1)-54(6) may be configured (e.g., equipped, programmed, etc.) with V4 router MAC table 28, indicating the next action to be performed according to the DIPs in packets incoming to the corresponding fabric modules 18(1)-18(6). Line cards 16(1)-16(N) (N being any integer greater than 1) include respective NFEs 56(1)-56(N). Each NFE 56(1)-56(N) may be configured with V6 router MAC table 26, indicating the next action to be performed according to the DIPs in packets incoming to the corresponding line cards 16(1)-16(N). Note that only 6 fabric modules are shown for ease of illustration; any number of fabric modules may be included within the broad scope of the embodiments. Also, each fabric module 18(1)-18(6) may be configured with more than one NFE.

Figure 6:
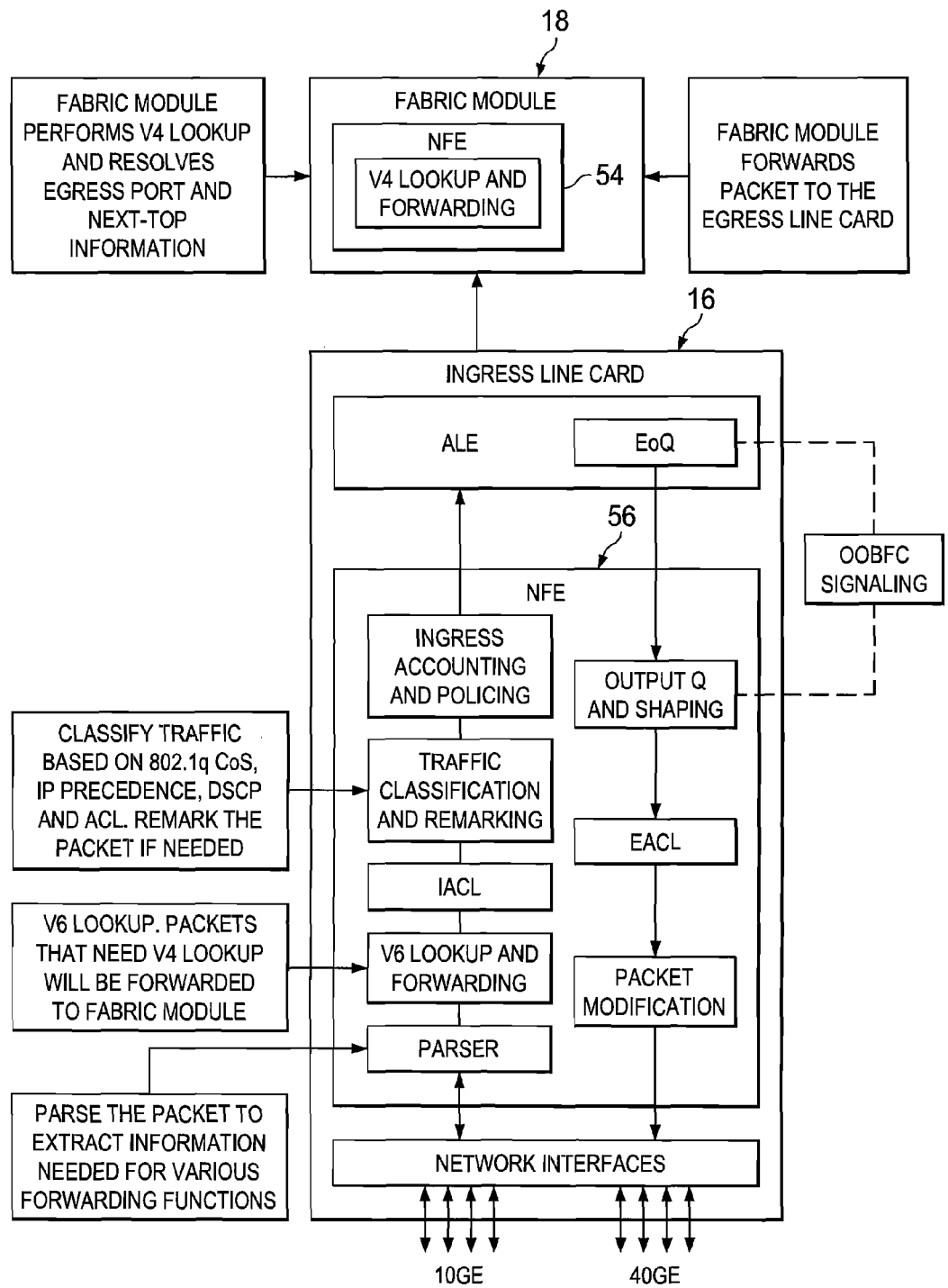
FIG. 6 is a simplified block diagram illustrating yet other example details of embodiments of the communication system.

Turning to FIG. 6, FIG. 6 is a simplified block diagram illustrating example details of an embodiment of communication system 10. When packet 30 ingresses modular switch 14 through a front panel port of line card 16, it goes through the ingress pipeline on NFE 56 of line card 16. Packet 30 is parsed to extract and save information such as L2 header, EtherType, L3 header, TCP IP protocols, etcetera, which can be used for various forwarding functions, such as packet lookup and processing logic. NFE 56 examines the DMAC of packet 30 and looks up V6 router MAC table 26 to determine the next action. If the router MAC is an HSRPv6 router MAC address, the next action may indicate an L3 lookup in NFE 56. On the other hand, if the router MAC is an HSRP (IPv4) address, the next action may indicate forwarding to a specific fabric module 18.

Inside the L3 lookup logic on NFE 56, the IPv6 DIP is used for searching in the L3 host table. If the DIP matches an entry in the L3 host table, the entry indicates the destination port, next-hop MAC address and egress VLAN. If there is no match to the IPv6 DIP in the L3 host table, packet 30 may be forwarded to fabric module 18 where the LPM lookup is performed as usual. Because no HSRPv6 MAC is programmed in V4 router MAC table 28 at fabric module 18, V4 router MAC table 28 may indicate that no further action is to be performed, and fabric module 18 may revert to the default action of performing an LPM lookup as usual. When performing L2 switching and L3 host routing, if the egress port is local to NFE 56, packets are forwarded locally by NFE 56 without going to fabric module 18.

Fabric module 18 can take different actions on packet 30 based on the lookup results on ingress line card 16. NFE 54 in fabric module 18 may inspect the flag in packet 30's internal header 32. In cases where packet 30 is an L2 switched or IPv6 L3 host routed packet, as indicated by the flag set to switch, ingress line card 16 has resolved the egress port, the next-hop MAC address and the egress VLAN information. Fabric module 18 may simply forward packet 30 to the egress line card, as usual. If packet 30 needs a LPM lookup, fabric module 18 searches the LPM table and uses the best match for the DIP to forward packet 30. If there is no match for the DIP, packet 30 is dropped.

In cases where packet 30 is to be routed, as indicated by the flag set to route, ingress line card 16 has not performed any L3 lookup on the DIP. NFE 54 in fabric module 18 may inspect V4 router MAC table 28 to determine the next action. For example, if the next action indicates L3 lookup, NFE 54 may perform a L3 lookup based on the IPv4 DIP in packet 30. The IPv4 DIP is used for searching in the L3 host table configured in NFE 54. If the DIP matches an entry in the L3 host table, the entry indicates the destination port, next-hop MAC address and egress VLAN. If there is no match to the IPv4 DIP in the L3 host table, an LPM lookup may perform as usual in fabric module 18. Not that additional operations, such as classifying traffic based on 802.1q CoS, IP precedence, ACL, etc. may be performed as usual before forwarding to fabric module 18. Fabric module 18 may forward packet 30 to the egress line card, as usual.

Figure 7:
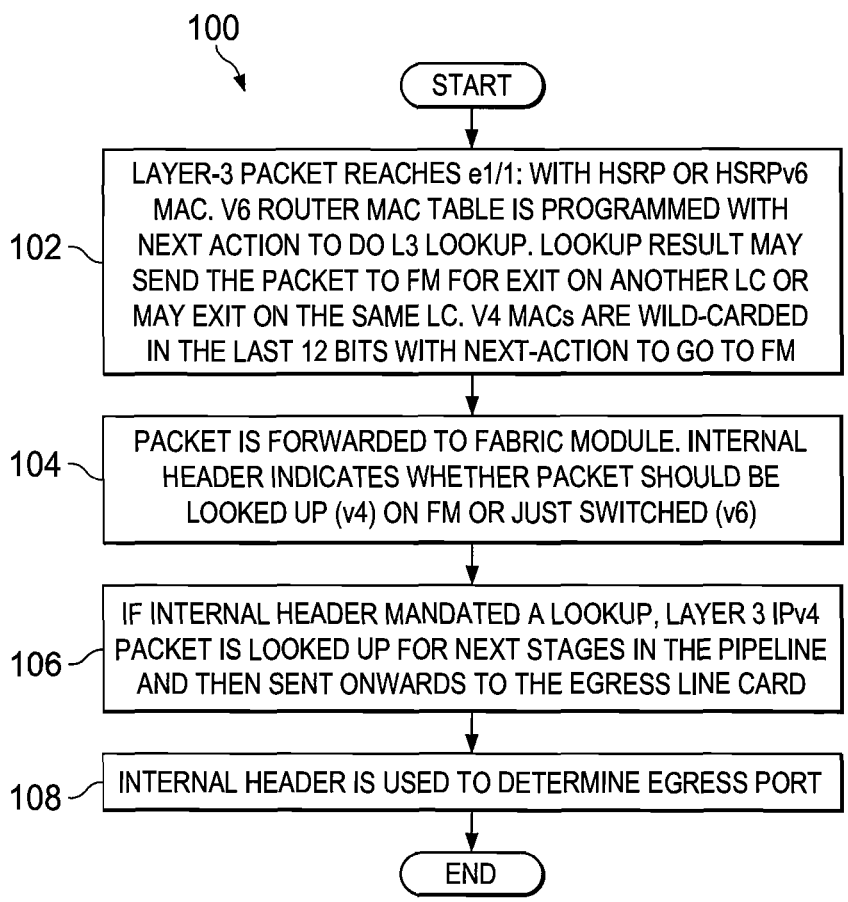
FIG. 7 is a simplified flow diagram illustrating example operations that may be associated with an embodiment of the communication system.

Turning to FIG. 7, FIG. 7 is a simplified flow diagram illustrating example operations 100 that may be associated with embodiments of communication system 10. At 102, L3 packet 30 may reach line card 16(1) (e.g., on port e1/1) with HSRP or HSRPv6 MAC information in its header. According to various embodiments, V6 router MAC table 26 is programmed with next action to perform L3 lookup. The lookup result may send packet 30 to fabric module 18 for exit on another line card (e.g., 16(2)) or to exit on same line card 16(1). In various embodiments, IPv4 router MACs are wildcarded in the last 12 bits with the next-action to go to fabric module 18. At 104, packet 30 is forwarded to the specific fabric module 18. Internal header 32 may indicate whether packet 30 should be looked up (e.g., for IPv4 DIPs or switched (e.g., for IPv6 DIPs). At 106, if internal header 32 mandates a lookup, L3 IPv4 packet 30 is looked up for next stages in the pipeline and then sent onwards to the egress line card (e.g., 16(2)). At 108, internal header 32 is used to determine the appropriate egress port to send packet 30 out of modular switch 14.

Figure 8:
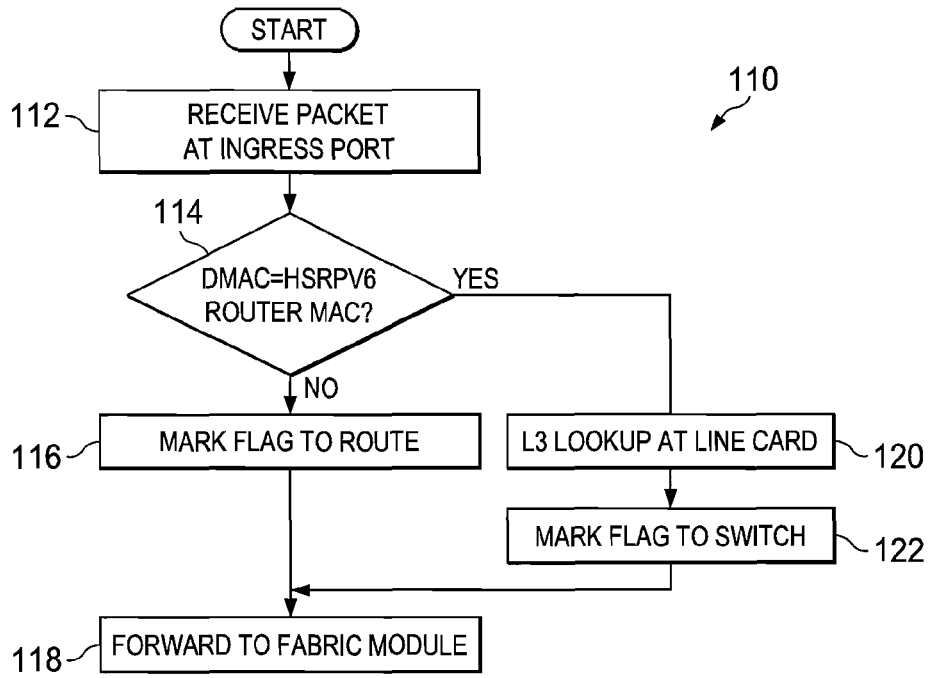
FIG. 8 is a simplified flow diagram illustrating other example operations that may be associated with an embodiment of the communication system.

Turning to FIG. 8, FIG. 8 is a simplified flow diagram illustrating example operations 110 that may be associated with embodiments of communication system 10. At 112, packet 30 may be received at an ingress port in line card 16(1). At 114, a determination may be made whether the DMAC of packet 30 is an HSRPv6 router MAC address (e.g., indicative of an IPv6 DIP). If the DMAC is not an HSRPv6 router MAC address (e.g., DMAC is an IPv4 HSRP router MAC address), at 116, the flag in internal header 32 may be marked to indicate routing. At 118, packet 30 may be forwarded to fabric module 18. Turning back to 114, if the DMAC is an HSRPv6 router MAC address, at 120, an L3 lookup may be performed at ingress line card 16(1) according to instructions in V6 router MAC table 26. At 122, the flag in internal header 32 may be marked to indicate switching, and the operations may step to 118, and packet 30 forwarded to fabric module 18.

Figure 9:
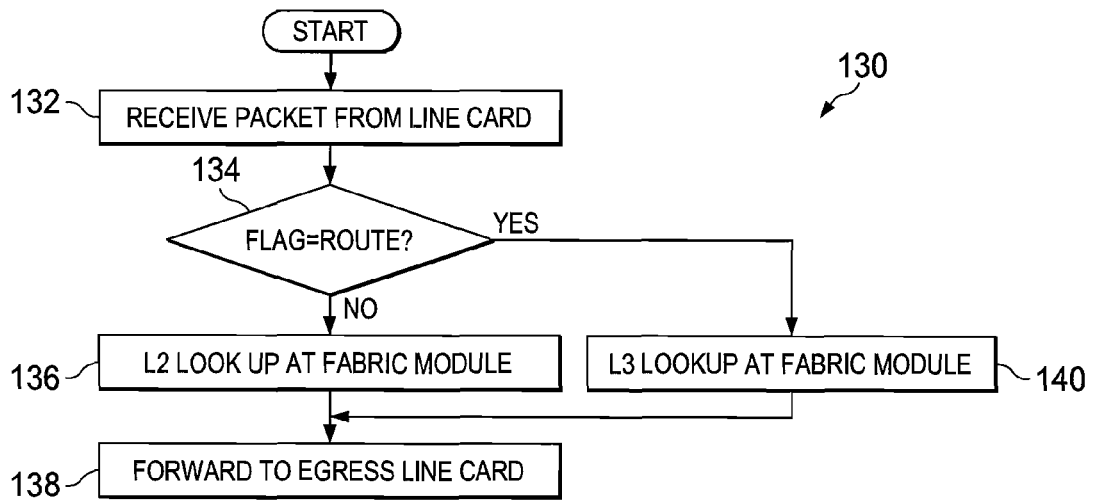
FIG. 9 is a simplified flow diagram illustrating yet other example operations that may be associated with an embodiment of the communication system.

Turning to FIG. 9, FIG. 9 is a simplified flow diagram illustrating example operations 130 that may be associated with embodiments of communication system 10. At 132, packet 30 may be received at fabric module 18 from ingress line card 16(1). At 134, a determination may be made whether packet 30 is to be switched or routed at fabric module 18 based on the flag in internal header 32. If the flag indicates switching, at 136, an L2 lookup may be performed at fabric module 18 to identify egress line card 16(2). At 138, packet 30 may be forwarded to egress line card 16(2). Turning back to 134, if the flag indicates routing at fabric module 18, at 140, an L3 lookup may be performed at fabric module 18 according to instructions in V4 router MAC table 28. The operations may step to 138, and packet 30 forwarded to egress line card 16(2).

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Note also that an 'application' as used herein this Specification, can be inclusive of an executable file comprising instructions that can be understood and processed on a computer, and may further include library modules loaded during execution, object files, system files, hardware logic, software logic, or any other executable modules. Furthermore, the words "optimize," "optimization," and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

In example implementations, at least some portions of the activities outlined herein may be implemented in software in, for example, modular switch 14. In some embodiments, one or more of these features may be implemented in hardware, provided external to these elements, or consolidated in any appropriate manner to achieve the intended functionality. The various network elements (e.g., modular switch 14) may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, modular switch 14 described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory element 24) can store data used for the operations described herein. This includes the memory element being able to store instructions (e.g., software, logic, code, etc.) in non-transitory media, such that the instructions are executed to carry out the activities described in this Specification. A processor can execute any type of instructions associated with the data to achieve the operations detailed herein in this Specification. In one example, processors (e.g., processor 22) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method executing in a modular switch in a network, wherein the method comprises:
   receiving packets from the network at a line card in the modular switch, a first portion of the packets being destined to Internet Protocol version 6 (IPv6) destination IP (DIP) addresses and a second portion of the packets being destined to IPv4 DIP addresses; and
   performing hierarchical lookups of the IPv6 DIP addresses and the IPv4 DIP addresses, with Layer 3 (L3) lookups for the IPv6 DIP addresses performed at the line card, L3 lookups for IPv4 DIP addresses performed at a fabric module in the modular switch that is interconnected with the line card inside a chassis of the modular switch, wherein the hierarchical lookups comprise:
   looking up a first router Media Access Control (MAC) table at the line card for a next action to be performed on the packets at the line card, wherein the next action comprises L3 routing for the first portion of the packets and forwarding for the second portion of the packets;
   forwarding the packets from the line card to the fabric module; and
   looking up a second router MAC table in the fabric module for a further next action to be performed on the packets at the fabric module, wherein the further next action comprises L2 switching for the first portion of the packets and L3 routing for the second portion of the packets.

2. The method of claim 1, wherein IPv6 routes are programmed on the line card, wherein IPv4 routes are programmed on the fabric module, wherein substantially all IPv4 routes are programmed on the line card to be forwarded to the fabric module without any L3 lookup at the line card.

3. The method of claim 1, further comprising:
   inspecting destination Media Access Control (DMAC) addresses in headers of the packets, wherein the DMAC address comprise router MAC addresses, wherein the router MAC addresses of the first portion of the packets are indicative of IPv6 address family, wherein the router MAC addresses of the second portion of the packets are indicative of IPv4 address family.

4. The method of claim 1, wherein the first router MAC table and the second router MAC table associate DMAC addresses of the packets with a next action to be performed.

5. The method of claim 4, wherein the first router MAC table at the line card indicates a next action comprising:
   for DMAC addresses comprising router MAC addresses indicative of IPv6 address family, L3 lookups of the IPv6 DIPs at the line card; and
   for DMAC addresses comprising router MAC addresses indicative of IPv4 address family, a single entry specifying forwarding to the fabric module, wherein a last 12 bits of the router MAC addresses are wild-carded.

6. The method of claim 4, wherein the second router MAC table at the fabric module indicates a next action comprising:
   for DMAC addresses comprising router MAC addresses indicative of IPv6 address family, switching to an egress line card at the fabric module; and for DMAC addresses comprising router MAC addresses indicative of IPv4 address family, L3 lookup of the IPv4 DIPs at the fabric module.

7. The method of claim 4, further comprising:
setting a flag in internal headers of the packets to indicate the further next action to be performed at the fabric module;
inspecting the flag at the fabric module;
and forwarding the second portion of the packets to appropriate egress line cards in the modular switch.

8. The method of claim 4, wherein a combination of the first router MAC table at the line card and the second router MAC table at the fabric module is larger than another router MAC table at the line card comprising entries with router MAC addresses corresponding to DIPS of both IPv6 and IPv4 address families.

9. The method of claim 1, wherein the modular switch comprises a plurality of line cards and another plurality of fabric modules, wherein each line card is connected to each fabric module, and vice versa.

10. The method of claim 1, wherein the modular switch comprises a first hop router configured for at least one of hot standby router protocol (HSRP), and virtual router redundancy protocol (VRRP), wherein the modular switch supports dual-stack networks.

11. Non-transitory tangible media that includes instructions for execution, which when executed by a processor, is operable to perform operations comprising:
receiving packets from the network at a line card in the modular switch, wherein a first portion of the packets are destined to IPv6 DIP addresses and a second portion of the packets are destined to IPv4 DIP addresses; and
performing hierarchical lookups of the IPv6 DIP addresses and the IPv4 DIP addresses, wherein L3 lookups for the IPv6 DIP addresses are performed at the line card, wherein L3 lookups for IPv4 DIP addresses are performed at a fabric module in the modular switch, wherein the line card and the fabric module are interconnected inside a chassis of the modular switch, wherein the hierarchical lookups comprise:
looking up a first router MAC table at the line card for a next action to be performed on the packets at the line card, wherein the next action comprises L3 routing for the first portion of the packets and forwarding for the second portion of the packets;
forwarding the packets from the line card to the fabric module; and
looking up a second router MAC table in the fabric module for a further next action to be performed on the packets at the fabric module, wherein the further next action comprises L2 switching for the first portion of the packets and L3 routing for the second portion of the packets.

12. The media of claim 11, wherein the first router MAC table and the second router MAC table associate DMAC addresses of the packets with a next action to be performed.

13. The media of claim 12, wherein the first router MAC table at the line card indicates a next action comprising:
for DMAC addresses comprising router MAC addresses indicative of IPv6 address family, L3 lookups of the IPv6 DIPs at the line card; and
for DMAC addresses comprising router MAC addresses indicative of IPv4 address family, a single entry specifying forwarding to the fabric module, wherein a last 12 bits of the router MAC addresses are wild-carded.

14. The media of claim 12, wherein the second router MAC table at the fabric module indicates a next action comprising:
for DMAC addresses comprising router MAC addresses indicative of IPv6 address family, switching to an egress line card at the fabric module; and
for DMAC addresses comprising router MAC addresses indicative of IPv4 address family, L3 lookup of the IPv4 DIPs at the fabric module.

15. The media of claim 12, further comprising:
setting a flag in internal headers of the packets to indicate the further next action to be performed at the fabric module;
inspecting the flag at the fabric module;
and forwarding the second portion of the packets to appropriate egress line cards in the modular switch.

16. An apparatus, comprising:
a line card; and
a fabric module, wherein the line card and the fabric module comprise a memory element for storing data and a processor, wherein the processor executes instructions associated with the data, wherein the processor and the memory element cooperate, such that the apparatus is configured for:
receiving packets from the network at the line card, wherein a first portion of the packets are destined to IPv6 DIP addresses and a second portion of the packets are destined to IPv4 DIP addresses; and
performing hierarchical lookups of the IPv6 DIP addresses and the IPv4 DIP addresses, wherein L3 lookups for the IPv6 DIP addresses are performed at the line card, wherein L3 lookups for IPv4 DIP addresses are performed at the fabric module, wherein the line card and the fabric module are interconnected inside a chassis of a modular switch, wherein the hierarchical lookups comprise:
looking up a first router MAC table at the line card for a next action to be performed on the packets at the line card, wherein the next action comprises L3 routing for the first portion of the packets and forwarding for the second portion of the packets;
forwarding the packets from the line card to the fabric module; and
looking up a second router MAC table in the fabric module for a further next action to be performed on the packets at the fabric module, wherein the further next action comprises L2 switching for the first portion of the packets and L3 routing for the second portion of the packets.

17. The apparatus of claim 16, wherein the first router MAC table and the second router MAC table associate DMAC addresses of the packets with a next action to be performed.

18. The apparatus of claim 17, wherein the first router MAC table at the line card indicates a next action comprising:
for DMAC addresses comprising router MAC addresses indicative of IPv6 address family, L3 lookups of the IPv6 DIPs at the line card; and
for DMAC addresses comprising router MAC addresses indicative of IPv4 address family, a single entry specifying forwarding to the fabric module, wherein a last 12 bits of the router MAC addresses are wild-carded.

19. The apparatus of claim 17, wherein the second router MAC table at the fabric module indicates a next action comprising:
for DMAC addresses comprising router MAC addresses indicative of IPv6 address family, switching to an egress line card at the fabric module; and for DMAC addresses comprising router MAC addresses indicative of IPv4 address family, L3 lookup of the IPv4 DIPs at the fabric module.

20. The apparatus of claim 17, further comprising:

setting a flag in internal headers of the packets to indicate the further next action to be performed at the fabric module;

inspecting the flag at the fabric module;

and forwarding the second portion of the packets to appropriate egress line cards in the modular switch.

* * * * *